United States Patent [19]
Douglas et al.

[11] 3,976,582
[45] Aug. 24, 1976

[54] OPTIMIZING PETROLEUM RECOVERY MICELLAR SYSTEMS UTILIZING ZETA POTENTIAL

[75] Inventors: Larry J. Douglas; Charles B. Wenger, both of Denver, Colo.

[73] Assignee: Marathon Oil Company, Findlay, Ohio

[22] Filed: Sept. 13, 1973

[21] Appl. No.: 397,025

[52] U.S. Cl. .......................... 252/8.55 D; 166/274; 166/275; 252/309; 252/312
[51] Int. Cl.² ..................... E21B 43/20; E21B 43/22
[58] Field of Search ...................... 252/8.55 D, 309; 166/274, 275

[56] References Cited
UNITED STATES PATENTS

| | | | |
|---|---|---|---|
| 3,275,075 | 9/1966 | Gogarty et al. | 166/274 |
| 3,330,343 | 7/1967 | Tosch et al. | 166/274 X |
| 3,504,744 | 4/1970 | Davis et al. | 166/274 X |
| 3,512,586 | 5/1970 | Holm | 166/274 X |
| 3,536,136 | 10/1970 | Jones | 252/8.55 X |
| 3,740,343 | 6/1973 | Jones et al. | 166/275 X |

*Primary Examiner*—Herbert B. Guynn
*Attorney, Agent, or Firm*—Joseph C. Herring; Jack L. Hummel

[57] ABSTRACT

Micellar systems having maximum zeta potential are utilized for the recovery of petroleum. The invention involves the discovery that, on varying the composition of micellar systems, the point of maximum zeta potential corresponds with the point of minimum sulfonate adsorption, e.g., on the formation rocks, and also corresponds with the point of maximum oil recovery by said micellar system.

14 Claims, 4 Drawing Figures

3,976,582

OPTIMIZING PETROLEUM RECOVERY MICELLAR SYSTEMS UTILIZING ZETA POTENTIAL

BACKGROUND OF THE INVENTION

1. Field of the Invention

The present invention relates to recovery of crude oil from oil-bearing subterranean formations through use of micellar systems.

2. Description of the Prior Art

Much patented and non-patented literature has been published regarding the formulation of micellar systems for the optimum recovery of petroleum from subterranean formations. Also, the measurement of zeta potential has been covered in a number of publications, primarily in the biological and biophysical fields. The following U.S. Patents discuss zeta potential to some extent: U.S. Pat. No. 3,454,487 teaches measurement of the electrokinetic potential (zeta potential) in an electrophoresis cell; U.S. Pat. No. 3,542,674 teaches the measurement of zeta potential to determine the optimum conditions for flocculation; U.S. Pat. No. 3,580,871 teaches techniques for preparation of polymer dispersions with positive zeta potential; U.S. Pat. No. 3,620,828 teaches the neutralization of zeta potential of clay pigments with polyethylene amine and a 3,5-piperidium homopolymer to provide conductive coatings on paper used in direct electrophotographic copiers; German Offen. No. 2,249,161 teaches the determination of optimum conditions for industrial water and waste treatment by determination of the zeta potential; and U.S. Pat. No. 3,639,327 teaches the use of cationic agents to lower the zeta potential in preparing latex adhesive. The following literature also deals with zeta potential, surface adsorption and surface potential, but does not relate to oil recovery: "Adsorption from Aqueous Solution," (ed. R. F. Gould), American Chem. Soc. Publication No. 79 (1968); R. J. Alkinson et al., J. Phys. Chem. 71, 550 (1967); D. W. Fuerstenau, Chemistry of Biosurfactants, Vol. 1, (M. L. Hair, ed.), Marcel Dekker, N.Y. (1971); D. W. Fuerstenau and H. J. Modi, J. Elec. Chem. Soc., Vol. 106, 336 (1959); J. J. Kipling, "Adsorption from Solution of Non-Electrolytes," Academic Press (1965); R. H. Ottewill and J. N. Shaw, Disc. Fara. Soc. No. 42, 154 (1966); J. Overbeek, J. Colloid Sci. (H. R. Kruyt, ed.), Vol. 1, Elsevier (1952) Chap. 4 and 5; G. A. Parks, Chem. Rev. 65, 177 (1965); G. A. Parks and P. L. de Bruyn, J. Phys. Chem. 66, 967 (1962); G. Schay, Chapter 3 "Surface and Colloid Science V. 2," Wiley-Interscience (1969); and F. Tokiwa, J. Coll. Int. Sci. 28, 145 (1968).

The present invention embodies the discovery that zeta potential offers a numerical measurement of a parameter which permits the optimizing of oil-recovery and the minimizing of undesirable adsorption of surfactant on rock formations.

SUMMARY

General Statement of the Invention

According to the present invention, oil-external micellar systems are formulated to maximize the zeta potential and therefore the system stability. Zeta potential can be maximized by varying the concentration of the water, the cosurfactant, or the concentration of the electrolyte in the surfactant concentration, or the surfactant, cosurfactant or electrolyte used. In short, the invention provides a guide to the variation of any parameter connected with the slug since varying any parameter in a direction which tends to increase the zeta potential can now be understood to be an improvement of the micellar system in terms of reducing undesirable adsorption and maximizing oil recovery.

"Zeta potential" as the term is used herein, is measured by conventional techniques and apparatus of electro osmosis such as those described in e.g., Potter, "Electro Chemistry," Cleaver-Hume Press Ltd., London (1961).

"Maximum zeta potential" as used herein, means a value of zeta potential, measured at constant electrical conductivity, as defined and more fully discussed in our copending U.S. patent application Ser. No. 397,026, filed Sept. 13, 1973, now U.S. Pat. No. 3,916,997. It is necessary to normalize the zeta potential values with respect to electrical conductivity, since zeta potential is, itself, a function of the electrical conductivity.

The term "micellar dispersion" as used herein, is meant to include micellar solutions, microemulsions, oleopathic hydromicelles, "transparent" emulsions, "fine" emulsions, and micellar solution technology taught in C. G. Sumner, Clayton's "The Theory of Emulsions and Their Technical Treatment," Fifth Edition, pp. 315–320 (1954). The examples of useful micellar solutions include those defined in U.S. Pat. Nos. 3,254,714 to Gogarty et al.; 3,275,075 to Gogarty et al.; 3,301,325 to Gogarty et al.; and 3,307,628 to Sena, and 3,348,611 to Reisberg. The micellar dispersion of this invention can be oil-external.

"Electro-osmosis" means the development of a potential (charge) on a solid surface placed in a solution and which is mirrored in the double layer of the solution near the surface. One can visualize this potential by assuming that a thin layer exists between the surface of the solid and the solution. The double layer is composed of two distinct regions: (1) an inner region (the Helmholtz layer) being rather rigidly structured and fixed by electrostatic forces connected with the solid surface, and (2) an outer region (the Stern or diffuse layer) where charges in solution become more random and the potential drops to zero going away from the surface. An imaginary plane drawn between the two layers is called the plane of shear, and the potential difference between the plane of shear and the bulk solution (zero) is called the zeta potential ($\zeta$). The zeta potential is a function of solution properties, e.g., conductivity and adsorbate species, and the surface properties of the solid material.

"Adsorption" means the preferential deposition of a component from a liquid at a solid/liquid interface. The term preferential is used to indicate that one of the components (including the solvent) of the solution adsorbs more strongly than the others.

"Surface tension" is used herein as measured by the conventional pendant drop technique as described in Harkins, W. D., and Brown, F. E., J. Amer. Chem. Soc. 41 499 (1919), Adamson, A. W. "Physical Chemistry of Surface" Interscience Pub. N.Y. (1967).

Most preferably, the micellar system to be used is within 3 millivolts of the absolute maximum. Less preferably, but still quite useful, is the use of micellar systems having zeta potentials within 3–6 millivolts of the maximum zeta potential.

DESCRIPTION OF THE PREFERRED EMBODIMENTS

Figure 1:
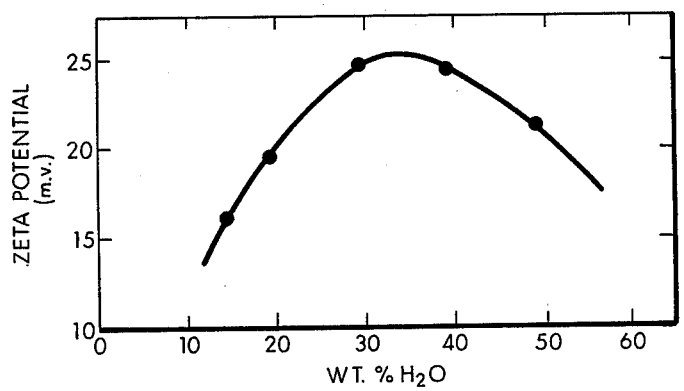
FIG. 1 is a graph of the zeta potential vs. the water concentration for a micellar system more fully described in Exammple I.

Hydrocarbons: Hydrocarbons useful in the micellar dispersions include crude oil (both sweet and sour) partially refined fractions of crude oil, refined fractions thereof, and liquefied petroleum gases.

Water: The aqueous medium can be soft, brackish, or a brine. Preferably, the water is soft, but it can contain small amounts of salts which do not precipitate on contact with the ions within the subterranean formation being flooded.

Surfactants: Surfactants useful with the dispersions include both cationic and anionic surfactants taught in the previously mentioned references.

Petroleum sulfonates (i.e., surfactants) are particularly useful with the dispersion, they are also known as alkyl aryl naphthenic sulfonates. Such can be obtained by sulfonating at least a portion of a sulfonatable hydrocarbon (e.g., gas oils) and then neutralizing the mixture, e.g., with $NH_4OH$, $NaOH$, etc. The sulfonate can contain, after extraction, e.g., 60–100 percent active sulfonate. Unsulfonated hydrocarbon within the sulfonates is useful as the hydrocarbon within this invention. Examples of preferred surfactants are the sodium and ammonium petroleum sulfonates having an average molecular weight of from about 360 to about 520, and more preferably from about 420 to about 470. The sulfonate can be a mixture of low and high molecular weight sulfonates. Surfactants of like character are also useful.

Cosurfactants: The cosurfactants, also known as cosolubilizers or semipolar organic compounds, useful with this invention include alcohols, amino compounds, esters, aldehydes and ketones containing from 1 to about 20 or more carbon atoms and more preferably from about 3 to about 16 carbon atoms. The cosurfactant is preferably an alcohol, e.g., isopropanol, n- and isobutanol, the amyl alcohols such as n-amyl alcohol, 1- and 2-hexanol, 1- and 2-octanol, decyl alcohols, alkaryl alcohols such as p-nonyl phenol and alcoholic liquors such as fusel oil. Particularly useful alcohols include isopropanol, the primary butanols, primary pentanols, and primary and secondary hexanols. Concentrations within the range of from about 0.01 to about 20 percent or more by volume of cosurfactant are useful in the micellar dispersion and more preferably from about 0.1 to about 5.0 percent. Mixtures of two or more cosurfactants are useful.

Electrolytes: Examples of electrolytes include inorganic bases, inorganic acids, inorganic salts, organic bases, organic acids, and organic salts which are strongly or weakly ionized. Preferably, the electrolytes are inorganic bases, inorganic acids, and inorganic salts, e.g., sodium hydroxide, sodium chloride, sodium sulfate, hydrochloric acid, sulfuric acid, and sodium nitrate. Examples of other useful electrolytes can be found in U.S. Pat. No. 3,330,343. The type of concentration of electrolyte will depend on the aqueous medium, surfactant, cosurfactant, and hydrocarbon. Generally from about 0.1 to about 4 percent or more by weight of electrolyte is useful, percents based on aqueous medium. The electrolyte can be the salts within brackish or brine water.

Temperature: In general, the temperature at which the micellar system is to be utilized, i.e., the temperature prevailing in the actual formation, should be used as the reference point to which the formulation should be designed and conductivities, etc. should be measured at or near that temperature. However, the use of the process of this invention enhances the thermal stability of the compositions employed with the invention.

Formulation of the Micellar System: Micellar systems can be prepared according to the techniques of the aforementioned prior art.

In general, preferred micellar systems will contain 5–20 weight percent surfactants, 5–60 percent hydrocarbon, 10–60 percent electrolyte solution in water, and about 1–5 percent cosurfactant. More preferred formulations will contain 5–15 percent surfactant, 25–60 percent hydrocarbon, 20–50 percent electrolyte solution in water, and about 1–3.5 percent cosurfactant. More preferred micellar systems will contain from about 5–10 percent surfactant, about 45–55 percent hydrocarbon, about 25–35 percent electrolyte in water, and about 1–2.5 percent cosurfactant.

Other Techniques: Size of the micellar dispersion slug useful with this invention is from about 1 to about 20 percent formation pore volume. Larger pore volumes are useful but such may be economically unattractive. More preferably, from about 2 to about 10 percent formation pore volumes are useful and from about 3 to about 6 percent formation pore volumes give very efficient results. The techniques of secondary type recovery of petroleum, including substantially all of those taught in the above-described prior art, are applicable to the present invention.

It is intended that all equivalents obvious to those skilled in the art be included within the scope of the invention as defined in the specification and appended claims.

EXAMPLES

In each of the examples, a micellar system is prepared having the composition described for each of the examples in Table I. A quantity of the micellar system, equivalent to 0.02 pore volumes of the core is injected into a 3 inch diameter by 4 foot long Berea sandstone core. The Berea core is prepared by first saturating with water, then being oil flooded, e.g., North Crawford County's pipeline crude oil, Illinois Basin crude oil, to residual water (that is, until no more water is emitted from the core), then water-flooded to residual oil (that is, until no additional oil is emitted from the core), using a simulated connate water. The water-flooded Berea core at this point simulates an oil field after conventional water flooding. A 0.02 pore volume slug (except in Example III where the slug was 0.05 pore volume) is then injected into the core to displace residual oil. Injection of the micellar dispersion is followed by injection of a drive fluid consisting of 0.95–1.05 pore volumes of 1000 ppm polyacrylamide solution in treated synthetic Palestine water. The "oil recovery" is calculated as the volume percent of the residual oil in place after water-flooding which residual oil is displaced during the injection process.

Figure 4:
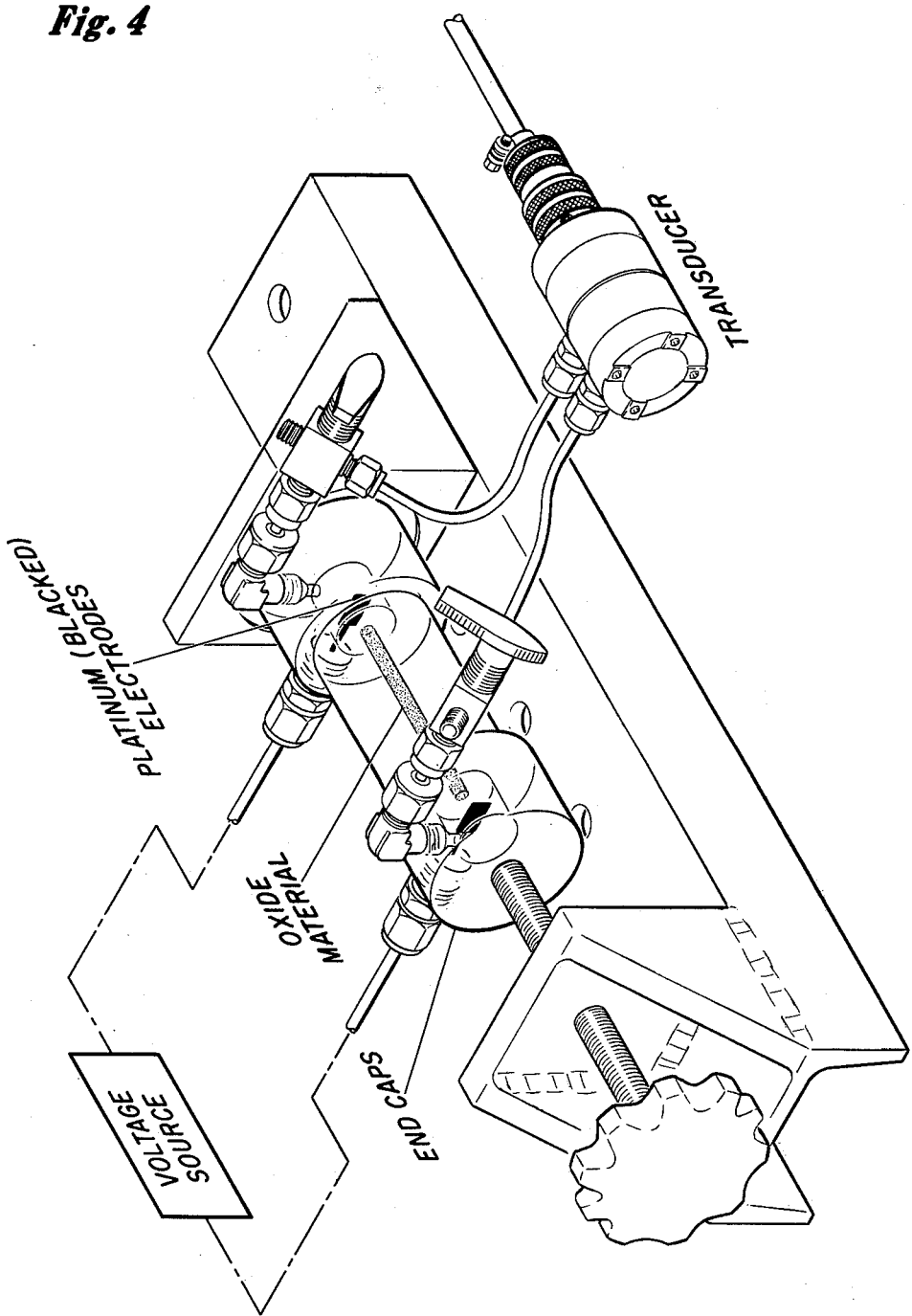
FIG. 4 shows the apparatus employed in the examples.

For the present study electro-osmosis was used as the experimental method for measuring the zeta potential between oxide surfaces and salt solutions. FIG. 4 shows the experimental set-up. The apparatus consists of two end caps, each fitted with a platinum (blacked) electrode and a pressure tap. The oxide sample is held in an epoxy potted capillary by a 320 mesh stainless steel screen.

The measurements were made with the apparatus assembled as shown in FIG. 4. The cell was completely filled with solution and then pressure sealed. A voltage was placed across the cell. This potential caused the solution outside of the plane of shear to move until enough pressure was built up to halt the movement. the formal relationship between the applied voltage and measured pressure was obtained by combining Darcy's Law with Smoluchowski's equation for electro-osmotic flow.

$$\Delta P = D\zeta E/4\pi kF$$

Where:
- $D$ = dielectric constant
- $E$ = potential (volts)
- $k$ = permeability
- $F$ = formation factor
- $\zeta$ = zeta potential (volts)
- $\Delta P$ = pressure (cmHg)

Rearranging and solving for $\zeta$ yields:

$$\zeta = 4\pi kF \Delta P/DE$$

$F$, $k$, and $D$ are constant for a specific system and $\zeta$ is easily calculated from the linear slope $\Delta P/E$.

The experimental technique, used to obtain adsorption values, involves the determination of the change in solution concentration of the preferred species either by direct analysis or by difference.

The equation which describes a physical adsorption isotherm is as follows:

$$M°\Delta r_1/m = \Gamma$$

Where:
- $\Gamma$ = adsorption in grams adsorbed/gram adsorbent
- $\Delta r_1 = r_1° - r_1^e$ = initial weight fraction – final weight fraction
- $m$ = mass in grams of adsorbent The model is based on a two-component solution and assumes physical adsorption as the major mechanism. Physical adsorption refers to a reversible, equilibrium process, with only electrostatic forces involved.

The experimental procedure was as follows. A sample of adsorbent (ground oxide) was weighed into a clean and dry 125-milliliter Erlemeyer flask fitted with a ground glass stopper. A measured amount of a solution of known concentration was added to the flask. The flask was stoppered and placed in a thermostated shaker bath at 30°C. for 24 to 48 hrs. The solution was stirred vigorously twice every 24 hours and then allowed to sit in the bath the remainder of the time. Upon removal from the bath the solution was analyzed for its final composition. Reviewing the equation above, the amount of adsorption of species 1 is:

$$\Gamma_1 = \frac{M°(\text{total weight of solution}) \cdot r_1°(\text{initial weight fraction}) - r_1^e(\text{final or equilibrium weight fraction})}{m(\text{grams of oxide})}$$

The equilibrium concentration $C_e$ (or $r_1$ final) is plotted against the amount of sulfonate adsorbed. This is done because it is the equilibrium concentration that relates to the thermodynamics of the system.

The amounts adsorbed, $\Gamma$, are expressed in the units micromoles per centimeter squared ($\mu m/cm^2$).

EXAMPLES I–V

A micellar system having a initial concentration as follows is prepared by shaking together the various components:

| | Weight percent |
|---|---|
| Surfactant (10%): | |
| Cosurfactant (1.0%): | |
| Hydrocarbon | |
| Water (containing 0.7 weight percent sodium sulfate): | |

Water containing the same concentration of salt and hydrocarbon are added in fixed amounts to the above composition until the various compositions represented by the small circles in FIG. 1 are obtained. Conductivity is measured at approximately $5 \times 10^{-4}$ ohm$^{-1}$ centimeters$^{-1}$ by the addition of small amounts of the cosurfactant as necessary. Each of the resultant compositions is sampled and measured for zeta potential, sulfonate adsorption. Percent hydrocarbon recovery is determined on a set of substantially identical samples.

Figure 2:
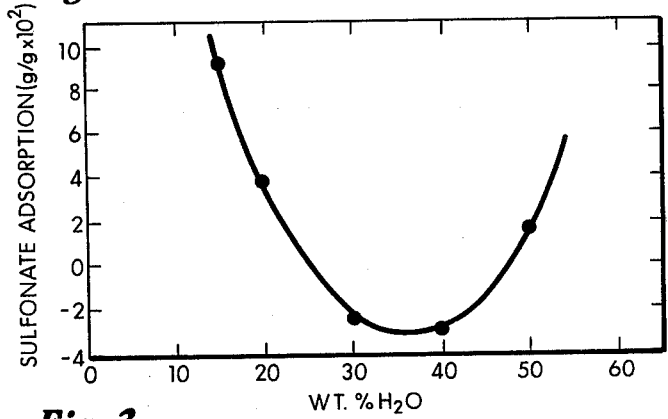
FIG. 2 is a graph of sulfonate adsorption as measured in Example II vs. weight concentration of water for the micellar system utilized in the preparation of FIG. 1.
Figure 3:
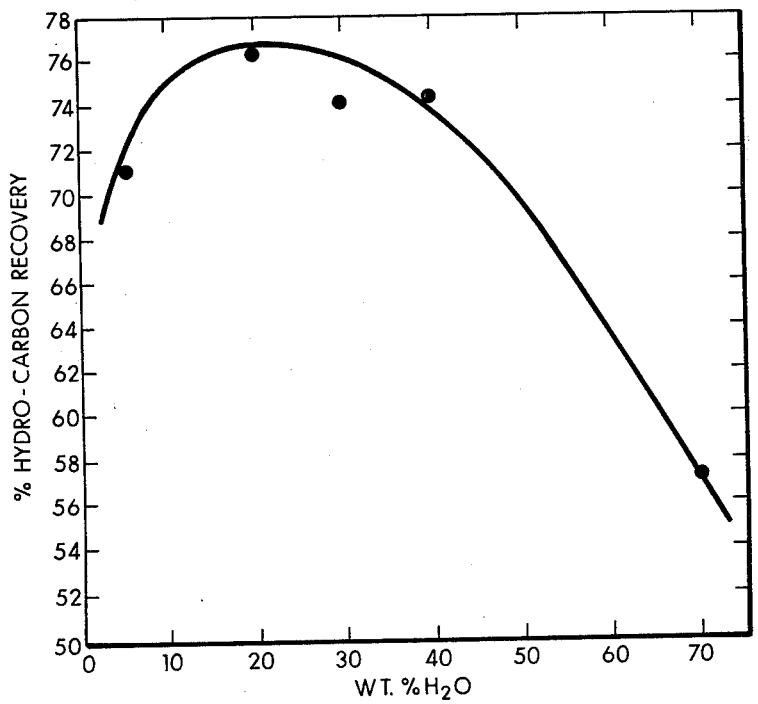
FIG. 3 is a graph of weight concentration of water in the same micellar system as utilized in FIGS. 1 and 2 vs. percent hydrocarbon recovery.

The values for each of these parameters are set forth in Table I and shown in the graphs of FIGS. 1, 2, and 3, respectively.

TABLE I

| Example | % Sulfonate | % $H_2O$ | % Hydrocarbon | % IPA | Hydrocarbon Recovery* |
|---|---|---|---|---|---|
| I | 10 | 10 | 78.5 | 1.5 | 73 |
| II | 10 | 20 | 68.5 | 1.5 | 76 |
| III | 10 | 30 | 58.5 | 1.5 | 74 |
| IV | 10 | 40 | 48 | 2.0 | 74 |
| V | 10 | 50 | 37.5 | 2.5 | 58 |

*Interpolated from FIG. 3.

The specific compositions described in these examples are those which optimize the stabilized systems of my aforementioned copending U.S. patent application Ser. No. 397,026. While the oil recovery shown might indicate some skewing of the oil recovery curve to the left from the zeta potential maximum, it is thought that the skewing may result from the lack of precision inherent in flooding in small cores.

EXAMPLE VI

A 5 percent pore volume micellar system prepared according to the techniques of Example I is injected into an injection well in communication with an oil-bearing formation in Crawford County, Illinois. As the slug is injected at 300 barrels/day, residual oil is gradually displaced toward a production well and produced oil is forced from the production well.

What is claimed is:

1. A process for stabilizing micellar systems for use in displacing petroleum in subterranean formations comprising surfactants, hydrocarbon, electrolyte solution in water, and cosurfactant by measuring the zeta potential of said micellar systems and thereafter varying the water or cosurfactant concentration to achieve a maximum zeta potential.

2. A process of claim 1 wherein the water or cosurfactant concentration is varied to achieve a zeta potential within 3 millivolts of the maximum zeta potential.

3. A process of claim 1 wherein the water or cosurfactant concentration is varied to achieve a zeta potential within at least 6 millivolts of the maximum zeta potential.

4. In a process for secondary recovery of petroleum by injecting of micellar systems in a subterranean petroleum-bearing reservoir to displace said petroleum, the improvement comprising preparing said micellar systems by mixing together a surfactant, hydrocarbon, electrolyte solution in water, and cosurfactant, and measuring the zeta potential of said micellar systems, the amount of cosurfactant being just sufficient to obtain a substantially maximum zeta potential.

5. A process according to claim 4 wherein said micellar systems have a zeta potential within 6 millivolts of the maximum zeta potential.

6. In a process for the displacement of petroleum comprising injecting micellar systems into subterranean petroleum-bearing formations to displace petroleum, the improvement comprising in combination measuring the zeta potential of said micellar systems and formulating said micellar systems so that they comprise:
   a. From about 3 to about 20 weight percent of surfactant,
   b. From about 5 to about 60 percent by weight of water containing electrolytes,
   c. From about 10 to 60 percent by weight hydrocarbon, and
   d. Cosurfactant in a quantity sufficient to provide a micellar system having a zeta potential within 10 percent of the maximum obtainable for such compositions.

7. A process according to claim 6 wherein said cosurfactant is selected from the group consisting of isopropyl alcohol, amyl alcohol, hexyl alcohol, cyclohexanone, and acetone.

8. A process according to claim 6 wherein said electrolytes comprise from about 5 to about 60 percent by weight based on the weight of the water of a salt selected from the group consisting of $NaCl$, $Na_2SO_4$, $KCl$, $K_2SO_4$, $KOH$, and $CaCl_2$.

9. A process according to claim 6 wherein said micellar system is formulated to be completely miscible with oil and substantially immiscible with water-containing electrolytes.

10. A process according to claim 9 wherein said cosurfactant is selected from the group consisting of isopropyl alcohol, amyl alcohol, hexyl alcohol, cyclohexanone, and acetone.

11. In a process for the displacement of petroleum comprising injecting micellar systems in the subterranean petroleum-bearing formations to displace said petroleum, the improvement comprising in combination measuring the zeta potential of said micellar systems and formulating said micellar systems so that they comprise:
   a. From about 3 to about 20 percent of surfactant,
   b. From about 10 to about 60 percent by weight hydrocarbon,
   c. From about 1 to about 3.5 percent cosurfactant, and
   d. Water in a quantity sufficient to provide a micellar system having a zeta potential within plus or minus 10 percent of the maximum obtainable for said composition.

12. A process according to claim 11 wherein said cosurfactant is selected from the group consisting of isopropyl alcohol, amyl alcohol, hexyl alcohol, cyclohexanone, and acetone.

13. A process according to claim 11 wherein said micellar system is formulated to be completely miscible with oil and substantially immiscible with water-containing electrolytes.

14. A process according to claim 13 wherein said cosurfactant is selected from the group consisting of isopropyl alcohol, amyl alcohol, hexyl alcohol, cyclohexanone, and acetone.

* * * * *